United States Patent
Nishikiuchi et al.

(10) Patent No.: US 6,710,905 B2
(45) Date of Patent: Mar. 23, 2004

(54) TANDEM SCANNING OPTICAL DEVICE

(75) Inventors: Hirofumi Nishikiuchi, Toyokawa (JP); Kenji Takeshita, Toyokawa (JP); Tsukasa Sugiura, Toyokawa (JP); Hajime Taniguchi, Toyokawa (JP); Hidenari Tachibe, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/347,450

(22) Filed: Jan. 21, 2003

(65) Prior Publication Data
US 2003/0137710 A1 Jul. 24, 2003

(30) Foreign Application Priority Data
Jan. 21, 2002 (JP) ...................................... 2002-010978

(51) Int. Cl.[7] ................................................ G02B 26/08
(52) U.S. Cl. .................... 359/204; 359/212; 359/223
(58) Field of Search .............................. 359/204, 212, 359/213, 214, 223, 224

(56) References Cited

U.S. PATENT DOCUMENTS 5,828,479 A * 10/1998 Takano et al. ............... 359/204
5,995,268 A * 11/1999 Shiraishi et al. ............. 359/204
6,052,211 A * 4/2000 Nakajima .................... 359/204

FOREIGN PATENT DOCUMENTS

JP 2000-334998 12/2000

* cited by examiner

Primary Examiner—Euncha P. Cherry
(74) Attorney, Agent, or Firm—Burns, Doane, Swecker & Mathis, L.L.P.

(57) ABSTRACT

Deflection of multiple laser beams, scanning of the photoreceptors by such beams in the main scanning direction and light path separation in the sub scanning direction are carried out by having multiple laser beams strike the same deflecting reflective surface of the deflector at different angles in the sub scanning direction. In order to adjust the incident angles in the sub scanning direction, the angles of the laser beams are simultaneously changed. In order to adjust the incident positions in the sub scanning direction, the laser beams are simultaneously moved in a parallel fashion by a light source adjustment unit.

8 Claims, 5 Drawing Sheets

TANDEM SCANNING OPTICAL DEVICE

The present application claims priority to Japanese Patent Application No. 2002-10978 filed Jan. 21, 2002, the entire content of which is hereby incorporated by reference.

BACKGROUND OF THE INVENTION

1. Field of the Invention

The present invention relates to a tandem scanning optical device, and more particularly, to a tandem-type scanning optical device that records an image on each of multiple photoreceptors based on exposure thereof via multiple deflected scanning laser beams in an image forming apparatus (such as a color laser printer or color digital copying machine), for example.

2. Description of the Related Art

Tandem scanning optical devices of the conventional art include a type of scanning optical device that records an image on each of multiple photoreceptors based on exposure thereof via scanning using laser beams deflected by the same surface of a deflector, such laser beams corresponding to multiple colors (such as the four colors of yellow (Y), magenta (M), cyan (C) and black (K), for example). A tandem scanning optical device of this type offers the advantages of faster scanning, a lower cost and a compact device size.

However, deflection of as well as scanning of photoreceptors by multiple laser beams using the same surface of a deflector without increasing the size of such deflector requires synthesis of the light paths of the laser beams before they strike the deflector and spatial separation of the light paths after the laser beams leave the deflector (the so-called synthesis/separation method). Therefore, a tandem scanning optical device is generally constructed such that the multiple laser beams strike the same surface of the deflector at different angles in the sub scanning direction (sub scanning direction). Because the incident angle and incident position are normally adjusted according to color, the problem arises that such a tandem scanning optical device has a high error sensitivity in connection with the scanning optical system (comprising elements such as fθ lenses) disposed behind the deflector, and accordingly, complex and high-precision adjustment is necessary in order to obtain a prescribed level of performance.

SUMMARY OF THE INVENTION

A main object of the present invention is to provide a tandem scanning optical device that is capable of performing easily and with high precision adjustment of the incident angles and incident positions of the multiple beams that strike the same surface of the deflector.

In order to attain the above object, the tandem scanning optical device of the present invention is a tandem scanning optical device that deflects and causes multiple beams to scan in the main scanning direction and separates the light paths of such beams in the sub scanning direction by causing them to strike the same surface of a deflector at different angles in the sub scanning direction, such optical device including first adjustment mechanism that changes the angles of the multiple beams simultaneously in order to adjust the beam incident angles relative to the same surface of the deflector in the sub scanning direction and second adjustment mechanism that moves the multiple beams simultaneously in a parallel fashion in order to adjust the beam incident positions on the same surface of the deflector in the sub scanning direction.

The tandem scanning optical device may further include a light source unit that emits multiple beams and a reflective mirror that simultaneously reflects the multiple beams emitted from the light source. The first adjustment mechanism may comprise a mirror adjustment unit that adjustably changes the orientation of the reflective mirror, and the second adjustment mechanism may comprise a light source adjustment unit that adjustably moves the light source unit in a parallel fashion.

The mirror adjustment unit may have a construction in which the orientation of the reflective mirror is adjusted by tightening, using a movable screw, one end of the reflective mirror pressed by a plate spring.

The tandem scanning optical device may further include a light source unit that emits multiple beams and a housing in which the light source unit is fixed in place, such light source unit having multiple legs the lengths of which can be changed in order to position the light source unit relative to the housing, wherein the legs serve as the first adjustment mechanism when the lengths of some of the legs are changed by a different amount from the remaining other legs, and as the second adjustment mechanism when the lengths of all of the legs are changed by the same amount.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
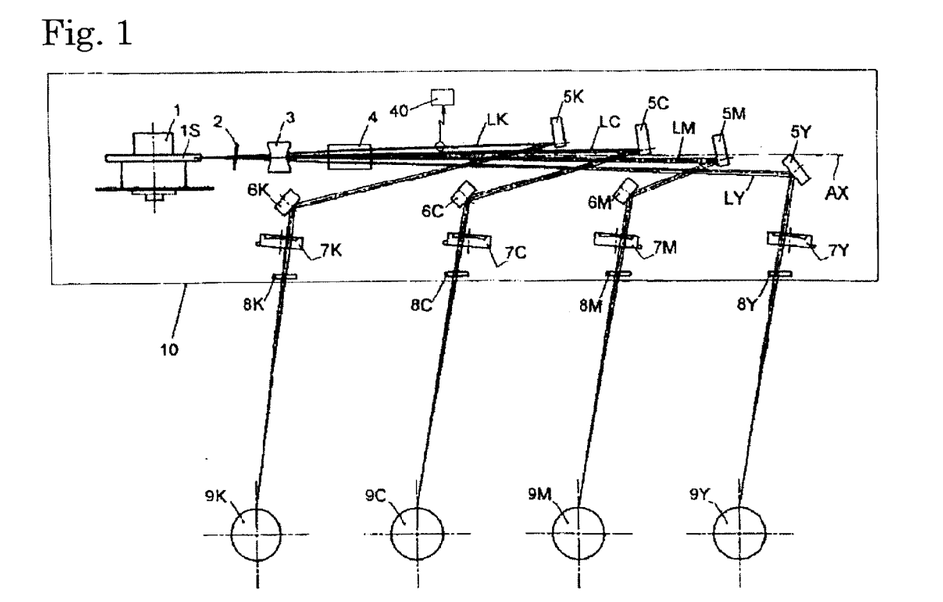
FIG. 1 is a sub scanning cross-sectional view showing the elements involved in light path separation pertaining to a first embodiment of the present invention.
Figure 2:
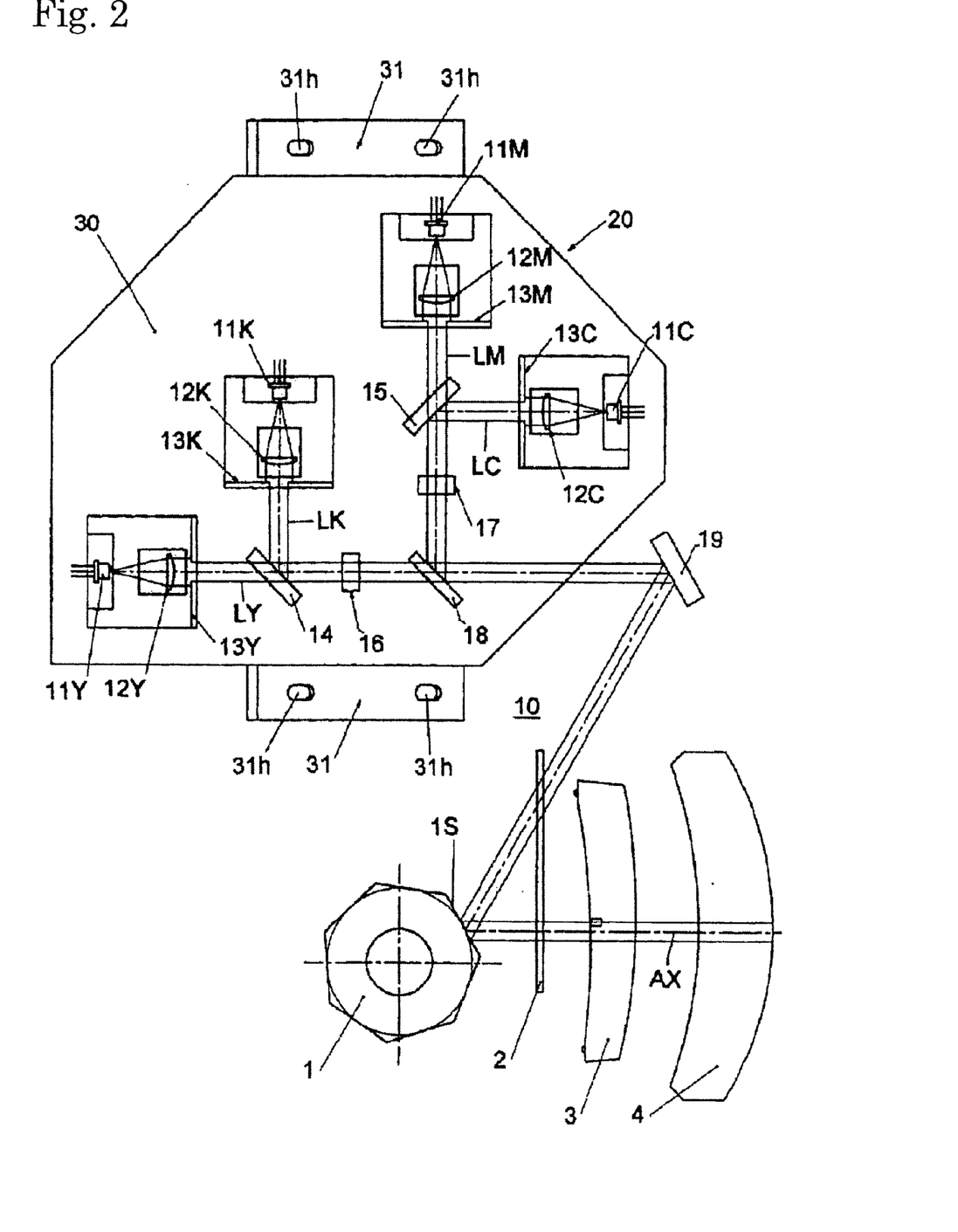
FIG. 2 is a main scanning plan view showing the elements involved in light path synthesis pertaining to the first embodiment of the present invention.

A tandem scanning optical device in which the present invention is applied is described below with reference to the drawings. FIGS. 1 and 2 show a first embodiment of the tandem scanning optical device used in a color image forming apparatus (such as a color laser printer or color digital copying machine). FIG. 1 is a sub scanning cross-sectional view mainly showing the elements involved in light path separation, and FIG. 2 is a main scanning plan view showing the elements involved in light path synthesis.

In FIGS. 1 and 2, 1 is a deflector (which comprises a polygon mirror in this embodiment, but is not limited thereto), 1S is a deflective reflecting surface (i.e., a deflective surface comprising a mirror surface), 2 is a polygon window, 3 and 4 are fθ lenses, 10 is a housing, LY, LM, LC and LK are laser beams, and AX is the optical axis of the fθ lenses 3 and 4. In FIG. 1, 5Y, 5M, 5C, 5K, 6M, 6C and 6K are reflective mirrors, 7Y, 7M, 7C and 7K are long cylindrical lenses, 8Y, 8M, 8C and 8K are print head windows, 9Y, 9M, 9C and 9K are photoreceptors, and 40 is an SOS (Start-Of-Scanning) sensor. In FIG. 2, 11Y, 11M, 11C and 11K are semiconductor lasers, 12Y, 12M, 12C and 12K are collimator lenses, 13Y, 13M, 13C and 13K are slits, 14, 15 and 18 are half-mirrors, 16 and 17 are cylindrical lenses, 19 is a reflective mirror, 20 is a light source unit, 30 is a light source unit support member, 31 is a mounting unit, and 31h is a long hole. The half-mirrors 14, 15 and 18 may be replaced by reflecting mirrors, which are disposed at different heights in the sub scanning direction such that they spatially synthesize the light paths of the laser beams without hindering the light paths.

This tandem scanning optical device uses the synthesis/separation method in which the light is deflected and caused to scan the photoreceptors in the main scanning direction while light path separation in the sub scanning direction is carried out by having the four laser beams LY, LM, LC and LK corresponding to the colors of Y, M, C and K, respectively, strike the same deflective reflecting surface 1S of the deflector 1, which deflects the light via rotation, at different angles in the sub scanning direction. The components other than the photoreceptors 9Y, 9M, 9C and 9K are mounted in the housing 10 at fixed positions, and the four photoreceptors 9Y, 9M, 9C and 9K that correspond to Y, M, C and K colors, respectively, are exposed and images are recorded thereon at the same time using the laser beams LY, LM, LC and LK emitted through the print head windows 8Y, 8M, 8C and 8K included in the housing 10. The main scanning direction is a direction in which each photoreceptor 9Y, 9M, 9C and 9K is scanned based on the deflection of the laser beams LY, LM, LC and LK, and the sub scanning direction is a direction that is perpendicular to the main scanning direction (i.e., perpendicular to the sheet bearing FIG. 2).

The construction of each component of the scanning optical device will now be described. As shown in FIG. 2, the light source unit 20 includes semiconductor lasers 11Y, 11M, 11C and 11K, collimator lenses 12Y, 12M, 12C and 12K, slits 13Y, 13M, 13C and 13K, half-mirrors 14, 15 and 18, and cylindrical lenses 16 and 17, as well as a light source unit support member 30 that integrally supports these optical elements. In this light source unit 20, relative position adjustment is carried out regarding the light paths of the four laser beams LY, LM, LC and LK. In other words, the light path of the yellow laser beam LY is deemed the standard, and position adjustment regarding the light paths of the laser beams LM, LC and LK for the other colors relative to the laser beam LY is completed on the light source unit support member 30 such that the light paths of the laser beams LY, LM, LC and LK that are emitted from the deflector 1 are spatially separated.

Each semiconductor laser 11Y, 11M, 11C and 11K emits one laser beam LY, LM, LC and LK corresponding to the colors Y, M, C and K, respectively. The laser beams LY, LM, LC and LK are formed into parallel light rays by the collimator lenses 12Y, 12M, 12C and 12K, and pass through the beam shaping slits 13Y, 13M, 13C and 13K, respectively. It is also acceptable if multi-beam type semiconductor lasers that emit two or more laser beams are used and exposure and scanning of each photoreceptor are performed using two or more laser beams. Furthermore, the number of laser beams is not limited to four. Any number is acceptable so long as the multiple numbers of laser beams required by the optical construction of the device are emitted from the light source unit 20.

Of the four laser beams that have passed the slits 13Y, 13M, 13C and 13K, the light paths of the yellow and black laser beams LY and LK are synthesized in the main scanning direction by the half-mirror 14, and are converged by the cylindrical lens 16 in the sub scanning direction. Similarly, the light paths of the magenta and cyan laser beams LM and LC are synthesized by the half-mirror 15 in the main scanning direction, and are converged by the cylindrical lens 17 in the sub scanning direction. The light paths of the laser beams LY, LM, LC and LK that have passed through the cylindrical lenses 16 and 17 are ultimately synthesized by the half-mirror 18 in the main scanning direction to essentially become parallel light rays in the main scanning direction, and are converged near the deflecting reflective surface 1S of the deflector 1 in the sub scanning direction.

The four laser beams LY, LM, LC and LK that have been emitted from the light source unit 20 are simultaneously reflected by the reflective mirror 19 and then are simultaneously deflected and reflected by the same deflecting reflective surface S located on the same position on the deflector 1. At this time, the four laser beams LY, LM, LC and LK strike the deflecting reflective surface 1S at different angles from each other in the sub scanning direction, and are deflected and reflected at different angles as shown in FIG. 1. The four laser beams LY, LM, LC and LK that have been deflected and reflected pass through the polygon window 2 and the fθ lenses 3 and 4 while the light paths of the light beams spatially separate from each other. Therefore, in order to ensure good image forming performance for all of the four colors of yellow, magenta, cyan and black at the same time, it is vital that the light paths of the laser beams LY, LM, LC and LK pass through the prescribed locations within the fθ lenses 3 and 4 (i.e., accuracy in light path separation is important).

Of the four laser beams LY, LM, LC and LK that have passed through the fθ lenses 3 and 4, the yellow laser beam LY is reflected by the reflective mirror 5Y, passes through the long cylindrical lens 7Y and the print head window 8Y, and forms an image on the photoreceptor 9Y. The magenta laser beam LM is reflected by the reflective mirrors 5M and 6M, passes through the long cylindrical lens 7M and the print head window 8M, and forms an image on the photoreceptor 9M. The cyan laser beam LC is reflected by the reflective mirrors 5C and 6C, passes through the long cylindrical lens 7C and the print head window 8C, and forms an image on the photoreceptor 9C. The black laser beam LK is reflected by the reflective mirrors 5K and 6K, passes through the long cylindrical lens 7K and the print head window 8K, and forms an image on the photoreceptor 9K. The four photoreceptors 9Y, 9M, 9C and 9K are exposed and scanned simultaneously by the four laser beams LY, LM, LC and LK, respectively, in this manner. Because the four laser beams LY, LM, LC and LK that have passed through the fθ lenses 3 and 4 pass very close to the reflective mirrors 5M, 5C and 5K while the light paths thereof are spatially separating from each other, precision in the light path separation is essential in order to prevent light path eclipse.

The four long cylindrical lenses 7Y, 7M, 7C and 7k are resin molded lenses that have the same configuration (the surface configuration is asymmetrical in the sub scanning direction) and are formed from the same material, but the yellow and magenta long cylindrical lenses 7Y and 7M are different from the cyan and black long cylindrical lenses 7C and 7K in their orientation. However, because the position at which the beam passes through each long cylindrical lens varies, in actuality, the beam passes through the comparable positions of the yellow long cylindrical lens 7Y and the black long cylindrical lens 7K and the comparable positions of the magenta long cylindrical lens 7M and the cyan long cylindrical lens 7C. Therefore, the yellow and black laser beams LY and LK that pass through optically equivalent positions of the fθ lenses 3 and 4 (symmetrical positions further away from the optical axis AX) pass through the comparable positions of the yellow and black long cylindrical lenses 7Y and 7K, while the magenta and cyan laser beams LM and LC that pass through optically equivalent positions of the fθ lenses 3 and 4 (symmetrical positions closer to the optical axis AX) pass through the comparable positions of the magenta and cyan long cylindrical lenses 7M and 7C.

The reason that the cylindrical lens 16 used for the convergence of the yellow and black laser beams LY and LK and the cylindrical lens 17 is used for the convergence of the magenta and cyan laser beams LM and LC in the light source unit 20 shown in FIG. 2 will now be explained. The long cylindrical lenses 7Y, 7M, 7C and 7K are designed to have a refractive power that is mainly effective in the sub scanning direction, such that the same lens back is obtained either with the beam passing positions of the long cylindrical lenses 7Y and 7K at which the yellow and black laser beams LY and LK pass or the beam passing positions of the long cylindrical lenses 7M and 7C at which the magenta and cyan laser beams LM and LC pass. However, due to processing errors or the like, the actual lens back varies slightly from the yellow and black long cylindrical lenses 7Y and 7K to the magenta and cyan long cylindrical lenses 7M and 7C.

Accordingly, in this embodiment, the cylindrical lens 16 of the light source unit 20 is used for the combination of the yellow and black laser beams LY and LK, which pass through the long cylindrical lenses 7Y and 7K at the comparable positions thereof, and the cylindrical lens 17 of the light source unit 20 is used for the combination of the magenta and cyan laser beams LM and LC, which pass through the long cylindrical lenses 7M and 7C at the comparable positions thereof. By using the cylindrical lenses 16 and 17 for the above combinations of lenses respectively in this way, the number of cylindrical lenses can be reduced, and compensation for lens back variation (i.e., focus adjustment) due to processing errors or the like, as described above, can be easily performed. In this embodiment, in consideration of processing errors regarding the long cylindrical lenses, compensation is carried out using two cylindrical lenses, but where the processing errors regarding the long cylindrical lenses are insignificant, only one cylindrical lens may be used.

The adjustment of the light path positions and the angle of each light beam traveling to the photoreceptors 9Y, 9M, 9C and 9K will now be explained. In a tandem scanning optical device such as this embodiment, the precision in the printing positions of the images of each color has a substantial effect on the resulting image quality. Major misalignments such as printing position variations and slanting of printing lines among the different colors can be corrected via registration correction technology. However, if minute misalignments such as printing dot density variations in the main scanning direction were to be corrected using current technologies, the cost of the control system would increase. Therefore, the asymmetry of magnification that causes printing dot density variations must be reduced.

The adjustment of asymmetry of magnification in the tandem scanning optical device of this embodiment is carried out by using the yellow laser beam LY as the standard and aligning the other laser beams, i.e., the magenta, cyan and black laser beams LM, LC and LK, using the reflective mirrors 5M, 5C and 5K. The magenta, cyan and black reflective mirrors 5M, 5C and 5K are set for a 15° or smaller incident angle (or reflection angle), and the adjustment of asymmetry of magnification is performed by rotating the reflective mirrors 5M, 5C and 5K using one of the short edges of each reflective mirror as the axis of rotation. The magenta, cyan and black reflective mirrors 5M, 5C and 5K are set for a 15° or smaller incident angle (or reflection angle) in order to prevent to the extent possible skew that occurs during adjustment.

In addition, in order to increase the printing position precision in the main scanning direction, the image formation timing must be synchronized by detecting, using a sensor, one of the laser beams LY, LM, LC and LK for the four colors yellow, magenta, cyan and black that separate from one other. In the tandem scanning optical device of this embodiment, the black laser beam LK is detected for such purpose using an SOS sensor 40 disposed outside the effective imaging area between the fθ lens 4 and the reflective mirror 5K. The black laser beam LK is used for SOS detection because it is one of the laser beams LM, LC and LK that have the largest number of optical elements in the light paths from the fθ lens 4 to the photoreceptors 9Y, 9M, 9C and 9K.

While yellow has a different number of optical elements as compared to magenta, cyan and black, in order to have the same light amount for the four colors, i.e., for the exposure of the photoreceptors 9Y, 9M, 9C and 9K, the light amounts for the magenta, cyan and lack laser beams LM, LC and LK immediately after they are emitted from the fθ lens 4 is adjusted to be larger than the light amount for the yellow laser beam LY. Therefore, if one of the magenta, cyan or black laser beams LM, LC or LK is used for the SOS detection, the light amount received by the light receiving surface of the SOS sensor 40 becomes large, the S/N ratio increases accordingly, and the light amplification ratio for the SOS sensor 40 need not be increased. Therefore, even if stray light enters the SOS sensor 40, it becomes noise, thereby preventing a reduction in printing position precision.

Furthermore, even though the number of optical elements is different for yellow as compared with magenta, cyan and black, if a reflective mirror 5Y having a low reflectance is used, the light amount on the photoreceptors 9Y, 9M, 9C and 9K, or for the four colors of yellow, magenta, cyan and black, can be made the same. In this case, it is not necessary for the magenta, cyan and black laser beams LM, LC and LK to have a larger light amount immediately following emission from the fθ lens 4 than the yellow laser beam LY, and therefore there is no restriction on the selection of the laser beam used for the SOS detection.

Because the reflective mirrors 5Y, 5M, 5C, 5K, 6M, 6C and 6K have different incident angles depending on the incident laser beam, the amount of reflected light varies for each color depending on not only the reflectance of the reflective mirror but also on the incident angle thereof. Therefore, in order to ensure that the photoreceptors 9Y, 9M, 9C and 9K receive the same amount of light, where the light amount varies among the laser beams LY, LM, LC and LK immediately following emission from the fθ lens 4, it is preferred that the laser beam having the largest light amount be used for the SOS detection, which enables the light amount received by the light receiving surface of the SOS sensor 40 to be large.

Figure 3:
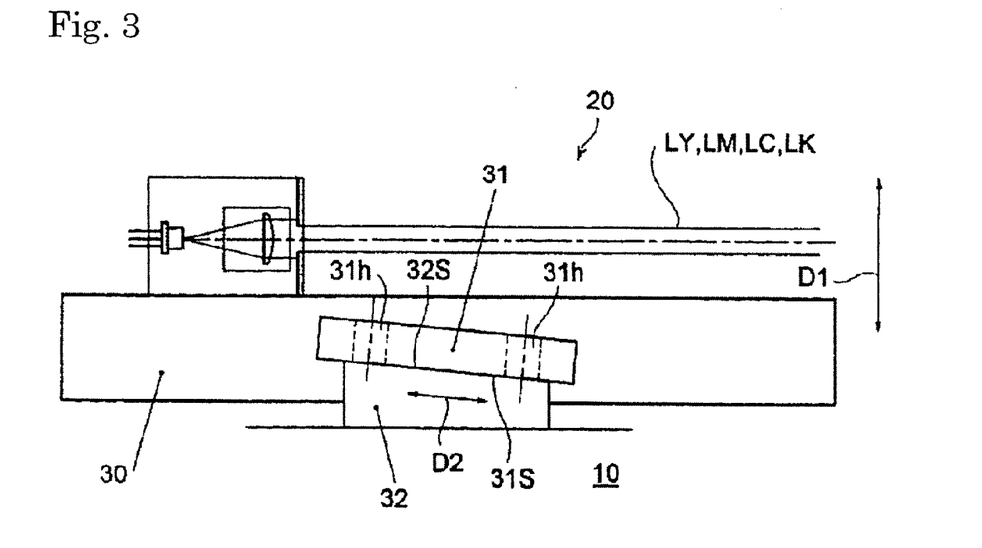
FIG. 3 is a sub scanning cross-sectional view showing the light path adjustment mechanism to move the laser beams in a parallel fashion in the first embodiment of the present invention.
Figure 4:
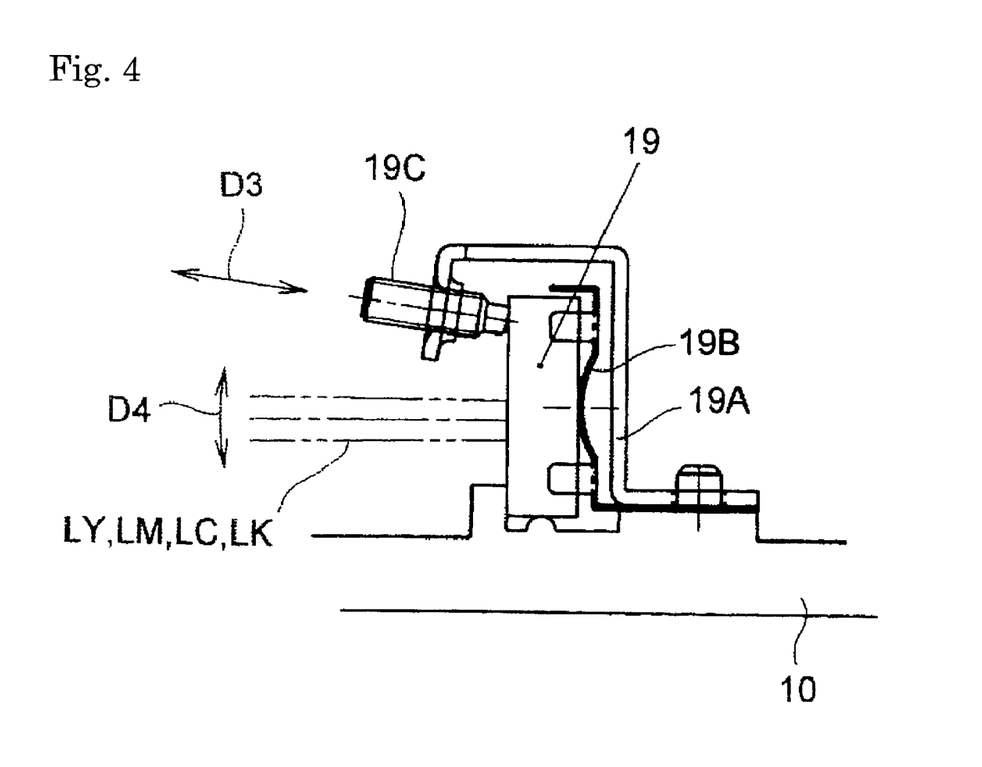
FIG. 4 is a sub scanning cross-sectional view showing the light path adjustment mechanism to change the angles of the laser beams in the first embodiment of the present invention.

The light path adjustment mechanism to adjust the incident angles and incident positions of the laser beams LY, LM, LC and LK on the deflecting reflective surface 1S of the deflector 1 will now be explained. FIGS. 3 and 4 show via sub scanning cross-sectional views the light path adjustment mechanisms incorporated in the light source unit 20 and the reflective mirror 19. FIG. 3 shows the light path adjustment mechanism to move the laser beams LY, LM, LC and LK in a parallel fashion and FIG. 4 shows the light path adjustment mechanism to change the angles of the laser beams LY, LM, LC and LK. In FIG. 3, 31 is a mounting unit, 31*h* is a long hole, 32 is a support and 31S and 32S are angled surfaces. In FIG. 4, 19A is a mirror support member, 19B is a plate spring and 19C is an adjustment screw.

As described above, precision in light path separation is important in order to improve the image forming performance for each color and prevent light path eclipse. In order to increase the precision in the light path separation, a light path adjustment mechanism capable of performing adjustment of the incident angles and incident positions of the laser beams LY, LM, LC and LK easily and with a high degree of precision. In order to adjust the incident angles of the four laser beams LY, LM, LC and LK that strike the same deflecting reflective surface 1S of the deflector 1 in the sub scanning direction, this embodiment has light path adjustment mechanisms comprising first adjustment mechanism that simultaneously changes the angles of the four laser beams LY, LM, LC and LK and second adjustment mechanism that simultaneously moves the four laser beams LY, LM, LC and LK in a parallel fashion.

The first adjustment mechanism comprises a mirror adjustment unit that adjustably changes the orientation of the reflective mirror 19. As shown in FIG. 4, the mirror adjustment unit is constructed such that it can adjust the angle of the reflective mirror 19 relative to the horizontal surface by tightening the upper area of the reflective mirror 19 pressed by the plate spring 19B via the adjustment screw 19C that can move in either direction of the two-headed arrow D3. Through this angle adjustment, the angles of the laser beams LY, LM, LC and LK are simultaneously changed in the sub scanning direction (i.e., in either direction of the two-headed arrow D4), and the incident angles of the laser beams LY, LM, LC and LK relative to the deflecting reflective surface 1S can be adjusted in the sub scanning direction. The incident position also changes as the incident angle changes, and can be adjusted by the light source adjustment unit (FIG. 3) described below.

The second adjustment mechanism comprises a light source adjustment unit that adjustably moves the light source unit 20 in a parallel fashion. The light source adjustment unit comprises, as shown in FIG. 3, a mounting unit 31 mounted to the light source unit support member 30, a support 32 that is formed on the housing 10, etc. The mounting unit 31 on the side of the light source unit support member 30 has an angled surface 31S that is angled by a certain degree relative to the horizontal surface, and the support 32 on the side of the housing 10 also has an opposite angled surface 32S that is angled by the same degree. When the angled surfaces 31S and 32S are slid in either direction of the two-headed arrow D2 while kept in contact with each other, the light source unit support member 30 moves in a parallel fashion relative to the horizontal surface, which moves the four laser beams LY, LM, LC and LK in a parallel fashion (in either direction of the two-headed arrow D1) simultaneously and adjusts the incident positions thereof on the deflecting reflective surface 1S in the sub scanning direction. While the focus positions also change as the incident positions change, because such changes are minute, this does not pose any problems (however, focus adjustment may be performed if necessary). The housing 10 and the light source unit support member 30 are fixed together using a screw inserted into the long holes 31*h* formed in the mounting unit 31.

As described above, because the relative position adjustment regarding the light paths of the four laser beams LY, LM, LC and LK is completed in the light source unit 20, if the light paths of the four laser beams LY, LM, LC and LK are simultaneously and integrally adjusted using the mirror adjustment unit (FIG. 4) and the light source adjustment unit (FIG. 3), the incident angles and the incident positions of the laser beams LY, LM, LC and LK striking the deflecting reflective surface 1S can be adjusted easily and with high precision. As a result, the four laser beams LY, LM, LC and LK reflected by the deflector 1 are emitted from the deflector 1 at desired positions and angles while maintaining their relative light path relationships, and thanks to the high light path separation precision, the light beams can pass through the prescribed positions of the fθ lenses 3 and 4 without having the light paths eclipsed by the reflective mirrors 5M, 5C or 5K.

In the first embodiment described above (FIGS. 1–4), the mirror adjustment unit (FIG. 4) that changes the angles of the laser beams LY, LM, LC and LK and the light source adjustment unit (FIG. 3) that moves the laser beams LY, LM, LC and LK in a parallel fashion are separated, with one located on the reflective mirror 19 side and the other located on the light source unit 20 side, but the same effect can naturally be obtained if both functions are concentrated on the light source unit (20). A tandem scanning optical device having such a construction is described below.

Figure 5:
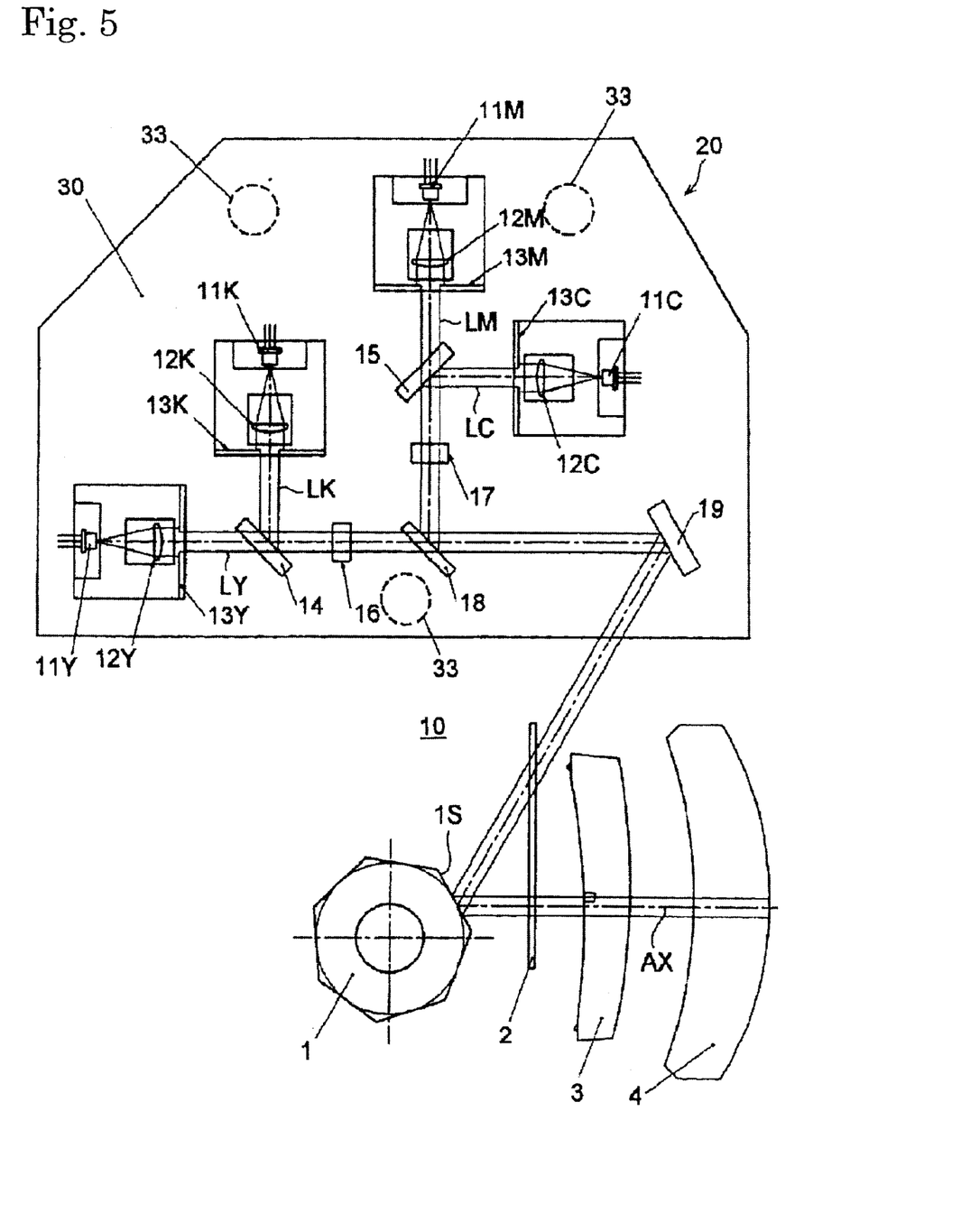
FIG. 5 is a main scanning plan view showing the elements involved in light path synthesis pertaining to a second embodiment of the present invention.
Figure 6:
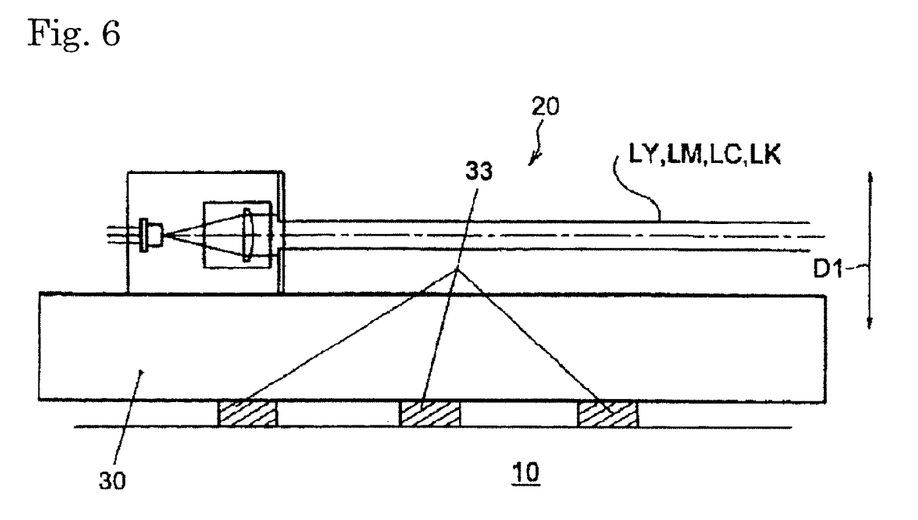
FIG. 6 is a sub scanning cross-sectional view showing the light path adjustment mechanism to move the laser beams in a parallel fashion or change the angles of such beams in the second embodiment of the present invention.

FIGS. 5 and 6 show a tandem scanning optical device of a second embodiment. FIGS. 5 and 6 respectively correspond to FIGS. 2 and 3 that show the construction of the first embodiment described above, and components that are identical or equivalent to those of the first embodiment are assigned the same numbers. In the second embodiment, the light source unit support member 30 that is a part of the light source unit 20 has three variable-length legs, which comprise a light path adjustment mechanism, and the positioning and fixing of the light source unit 20 to the housing 10 are carried out using these three legs 33. Each leg 33 has a screw structure, and changes its length when rotated, thereby changing the distance between the housing 10 and the light source unit support member 30 at the position of the leg. Therefore, by changing the length of one or two of the legs 33 to be different from the length of the remaining leg or legs 33, the legs function as first adjustment mechanism. By changing the lengths of all legs 33 by the same amount, the legs function as second adjustment mechanism.

For example, if the lengths of the three legs 33 are changed by the same amount, the light source unit support member 30 is moved in a parallel fashion relative to the horizontal surface. Therefore, the four laser beams LY, LM, LC and LK can be simultaneously moved in a parallel fashion in the sub scanning direction (either direction of the two-headed arrow D1 in FIG. 6) to adjust the incident positions of the laser beams LY, LM, LC and LK on the deflecting reflective surface 1S in the sub scanning direction. If the length of at least one leg 33 is changed to be different from the lengths of the other legs, the light source unit support member 30 becomes angled in accordance with the position of the leg 33 and the difference in the amounts by which the lengths of the legs were changed. Therefore, the angles of the laser beams LY, LM, LC and LK can be simultaneously changed in the sub scanning direction to adjust the incident angles of the laser beams LY, LM, LC and LK relative to the deflecting reflective surface 1S in the sub scanning direction. The number of legs 33 is not limited to three. It may be two or four or more. By having multiple legs 33 using an arrangement suited to the optical construction of the device, effective light path adjustment can be obtained.

Because the legs 33 function as the first adjustment mechanism in this embodiment, the mirror adjustment unit (FIG. 4) that changes the angles of the laser beams. LY, LM, LC and LK need not be located on the reflective mirror 19, which can be directly fixed at a prescribed position on the light source unit support member 30. However, if the mirror adjustment unit (FIG. 4) is located on the light source unit support member 30 and the orientation of the reflective mirror 19 is made adjustable, incident angle adjustment can be performed with increased precision. If there is no need for the reflective mirror 19 due to the optical construction of the device, the laser beams LY, LM, LC and LK can be allowed to strike the deflector 1 directly from the light source unit 20.

As described above, because the tandem scanning optical device pertaining to the present invention has a construction in which the angles of the multiple beams are simultaneously changed by first adjustment mechanism and are simultaneously moved in a parallel fashion by second adjustment mechanism, adjustment of the incident angles and positions of the multiple beams that strike the same surface of the deflector can be performed easily and with high precision.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A tandem scanning optical device that deflects and causes multiple beams to scan in a main scanning direction and separates light paths of such beams in a sub scanning direction by causing them to strike same surface of a deflector at different angles in the sub scanning direction, comprising:

a first adjustment mechanism that changes the angles of the multiple beams simultaneously in order to adjust the beam incident angles relative to the same surface of the deflector in the sub scanning direction; and a second adjustment mechanism that moves the multiple beams simultaneously in a parallel fashion in order to adjust the beam incident positions on the same surface of the deflector in the sub scanning direction.

2. The tandem scanning optical device of claim 1, further comprising:

a light source unit which emits the multiple beams; and a reflective mirror which simultaneously reflects the multiple beams emitted from the light source, wherein the first adjustment mechanism comprise a mirror adjustment unit that adjustably changes orientation of the reflective mirror, and the second adjustment mechanism comprise a light source adjustment unit that adjustably moves the light source unit in a parallel fashion.

3. The tandem scanning optical device of claim 1, further comprising:

a light source unit which emits the multiple beams;

wherein the second adjustment mechanism comprise a light source adjustment unit that adjustably moves the light source unit in a parallel fashion.

4. The tandem scanning optical device of claim 1, further comprising:

a reflective mirror which simultaneously reflects the multiple beams, wherein the first adjustment mechanism comprise a mirror adjustment unit that adjustably changes orientation of the reflective mirror.

5. The tandem scanning optical device of claim 4, wherein the mirror adjustment unit has a construction in which the orientation of the reflective mirror is adjusted by tightening, using a movable screw, one end of the reflective mirror pressed by a plate spring.

6. The tandem scanning optical device of claim 1, further comprising:

a light source unit which emits the multiple beams; and a housing in which the light source unit is fixed in place, wherein the light source unit has multiple legs the lengths of which can be changed in order to position the light source unit relative to the housing, and the legs serve as the first adjustment mechanism when the lengths of some of the legs are changed by a different amount from the remaining other legs.

7. The tandem scanning optical device of claim 1, further comprising:

a light source unit which emits the multiple beams; and a housing in which the light source unit is fixed in place, wherein the light source unit has multiple legs the lengths of which can be changed in order to position the light source unit relative to the housing, and the legs serve as the second adjustment mechanism when the lengths of all of the legs are changed by the same amount.

8. A tandem scanning optical device, comprising:

a light source unit which emits multiple beams;

a deflector, wherein the multiple beams strike same surface of the deflector at different angles in a sub scanning direction;

a first adjustment mechanism that changes the angles of the multiple beams simultaneously in order to adjust the beam incident angles relative to the same surface of the deflector in the sub scanning direction; and a second adjustment mechanism that moves the multiple beams simultaneously in a parallel fashion in order to adjust the beam incident positions on the same surface of the deflector in the sub scanning direction.

* * * * *